(12) United States Patent
Aoyama et al.

(10) Patent No.: US 8,977,267 B2
(45) Date of Patent: Mar. 10, 2015

(54) COMMUNICATION CONTROL METHOD AND RADIO BASE STATION

(75) Inventors: Tetsuya Aoyama, Tokyo (JP); Yuya Takatsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 716 days.

(21) Appl. No.: 13/318,494

(22) PCT Filed: May 21, 2009

(86) PCT No.: PCT/JP2009/059372
§ 371 (c)(1),
(2), (4) Date: Nov. 2, 2011

(87) PCT Pub. No.: WO2010/134186
PCT Pub. Date: Nov. 25, 2010

(65) Prior Publication Data
US 2012/0040710 A1      Feb. 16, 2012

(51) Int. Cl.
*H04W 36/00* (2009.01)
*H04W 36/30* (2009.01)
*H04W 36/08* (2009.01)

(52) U.S. Cl.
CPC .......... *H04W 36/30* (2013.01); *H04W 36/0016* (2013.01); *H04W 36/0066* (2013.01);
(Continued)

(58) Field of Classification Search
CPC ................. H04W 36/0005; H04W 36/0016; H04W 36/0066; H04W 36/0072; H04W 36/0083
USPC ............ 455/422.1, 424, 432.1–432.3, 435.2, 455/436–444, 101, 517; 370/331
See application file for complete search history.

(56) References Cited

U.S. PATENT DOCUMENTS 6,678,256 B1 *  1/2004  Sato ........................... 370/310.1
7,697,930 B2 *  4/2010  Miao et al. ................. 455/432.1
(Continued)

FOREIGN PATENT DOCUMENTS

CN          1981483 A       6/2007
CN        101282569 A      10/2008
(Continued)

OTHER PUBLICATIONS

Toh, C-K., "Ad Hoc Mobile Wireless Network—Protocol and System-," Kyoritsu Shuppan Co., Ltd., Total 8 Pages, (2003) (with partial English translation).
(Continued)

*Primary Examiner* — Dominic E Rego
(74) *Attorney, Agent, or Firm* — Oblon, McClelland, Maier & Neustadt, L.L.P.

(57) ABSTRACT

A communication control method executed in a multi-hop cellular network including at least one gateway and a plurality of radio base stations includes: a first radio base station performing radio resource management and movement management concerning a radio mobile station requesting, when the first radio base station determines it is necessary to switch a connection destination of the radio mobile station, a second radio base station at a handover destination to perform handover processing and instructing the radio mobile station (a handover execution mobile station) to perform handover to the second radio base station; and the second radio base station determining, based on the number of times of transfer until a signal transmitted from the first radio base station reaches the own station, whether to change the radio base station that performs the radio resource management and the movement management concerning the handover execution mobile station.

19 Claims, 10 Drawing Sheets

(52) U.S. Cl.
CPC ...... *H04W36/0005* (2013.01); *H04W 36/0083* (2013.01); *H04W 36/0072* (2013.01); *H04W 36/08* (2013.01)
USPC .......................... 455/436; 455/439; 455/442

(56) References Cited

U.S. PATENT DOCUMENTS

| | | | |
|---|---|---|---|
| 7,917,121 B2* | 3/2011 | Kim et al. .................. | 455/343.2 |
| 2001/0046855 A1* | 11/2001 | Kil ................. | 455/421 |
| 2004/0048624 A1* | 3/2004 | Ko et al. ....................... | 455/457 |
| 2005/0026615 A1* | 2/2005 | Kim .............................. | 455/436 |
| 2005/0135400 A1* | 6/2005 | Abe et al. ...................... | 370/431 |
| 2005/0207340 A1* | 9/2005 | O'Neill ......................... | 370/230 |
| 2006/0084445 A1* | 4/2006 | Minami et al. ............. | 455/452.1 |
| 2007/0104223 A1 | 5/2007 | Lee et al. | |
| 2007/0189252 A1 | 8/2007 | Kawakami | |
| 2008/0108326 A1 | 5/2008 | Park et al. | |
| 2008/0182579 A1* | 7/2008 | Wang et al. .................. | 455/436 |
| 2008/0205393 A1* | 8/2008 | Jeong ............................ | 370/389 |
| 2008/0267131 A1* | 10/2008 | Kangude et al. ............. | 370/331 |
| 2008/0316972 A1* | 12/2008 | Shaheen ....................... | 370/331 |
| 2009/0047970 A1* | 2/2009 | Kim et al. ..................... | 455/450 |
| 2009/0052392 A1* | 2/2009 | Sumasu et al. ................ | 370/331 |
| 2009/0141684 A1* | 6/2009 | Hashimoto et al. ........... | 370/331 |
| 2009/0274122 A1* | 11/2009 | Wu ............................... | 370/331 |
| 2009/0290554 A1* | 11/2009 | Siltala et al. .................. | 370/331 |
| 2009/0318155 A1* | 12/2009 | Fukuzawa et al. ............ | 455/438 |
| 2010/0002650 A1* | 1/2010 | Ahluwalia .................... | 370/331 |
| 2010/0014455 A1* | 1/2010 | Oulai et al. ................... | 370/328 |
| 2010/0248724 A1* | 9/2010 | Soliman ........................ | 455/436 |

FOREIGN PATENT DOCUMENTS

| | | |
|---|---|---|
| JP | 2003 224589 | 8/2003 |
| JP | 2007 129726 | 5/2007 |

OTHER PUBLICATIONS

3GPP TR 25.832, V4.0.0, $3^{rd}$ Generation Partnership Project, Technical Specification Group Radio Access Network, Manifestations of Handover and SRNS Relocation (Release 4), Total 13 Pages, (Mar. 2001).

3GPP TS 23.401, V8.3.0, $3^{rd}$ Generation Partnership Project, Technical Specification Group Services and System Aspects, General Packet Radio Service (GPRS) enhancements for Evolved Universal Terrestrial Radio Access Network (E-UTRAN) access (Release 8), Total 204 Pagesl, (Sep. 2008).

International Search Report Issued Jun. 23, 2009 in PCT/JP09/059372 Filed May 21, 2009.

Combined Office Action and Search Report issued Nov. 20, 2013 in Chinese Patent Application No. 200980159392.3 (with Partial English tanslation).

Combined Chinese Office Action and Search Report issued Jul. 14, 2014 in Patent Application No. 200980159392.3 (with partial English translation and English translation of categories of cited documents).

Extended European Search Report issued May 8, 2014 in Patent Application No. 09844919.2.

\* cited by examiner

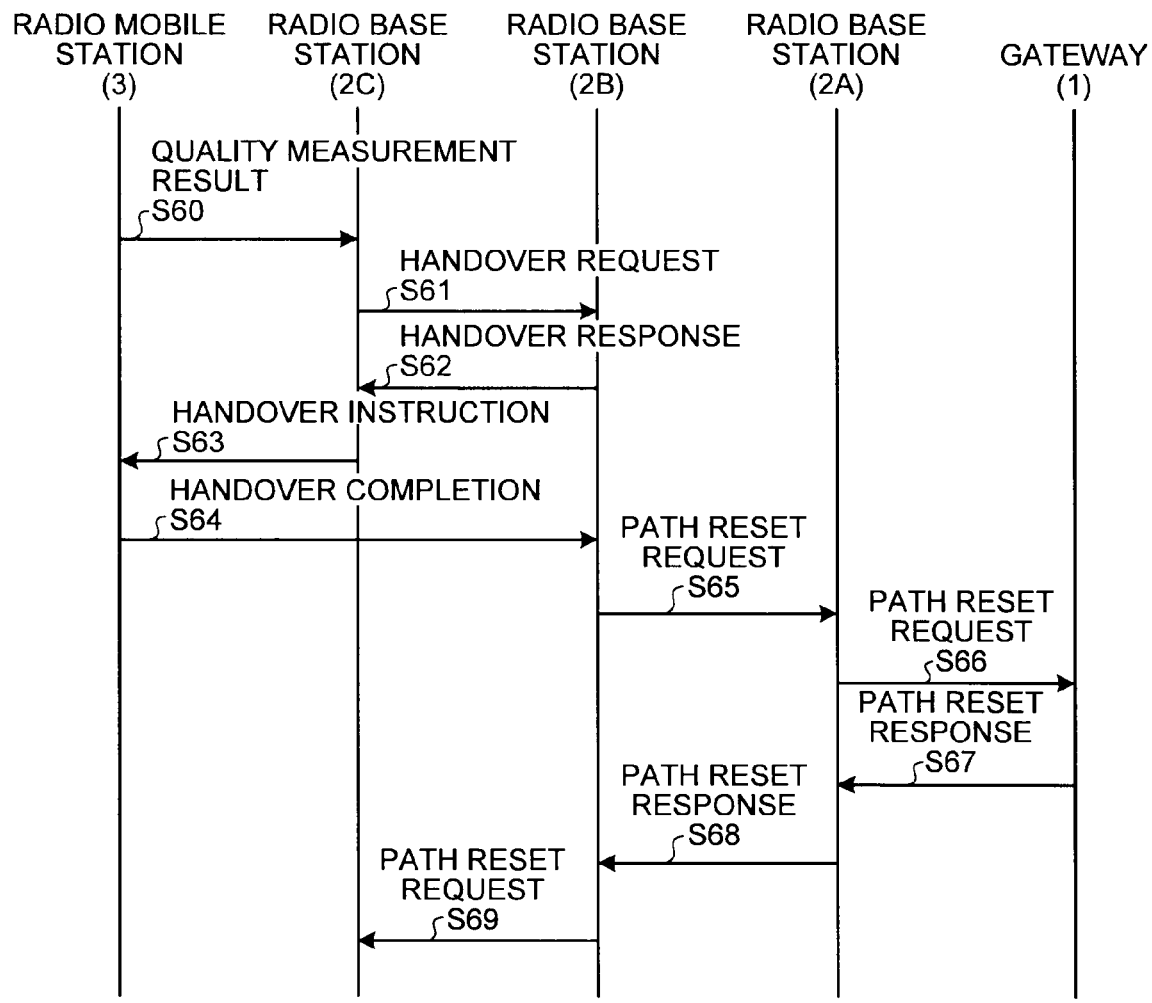

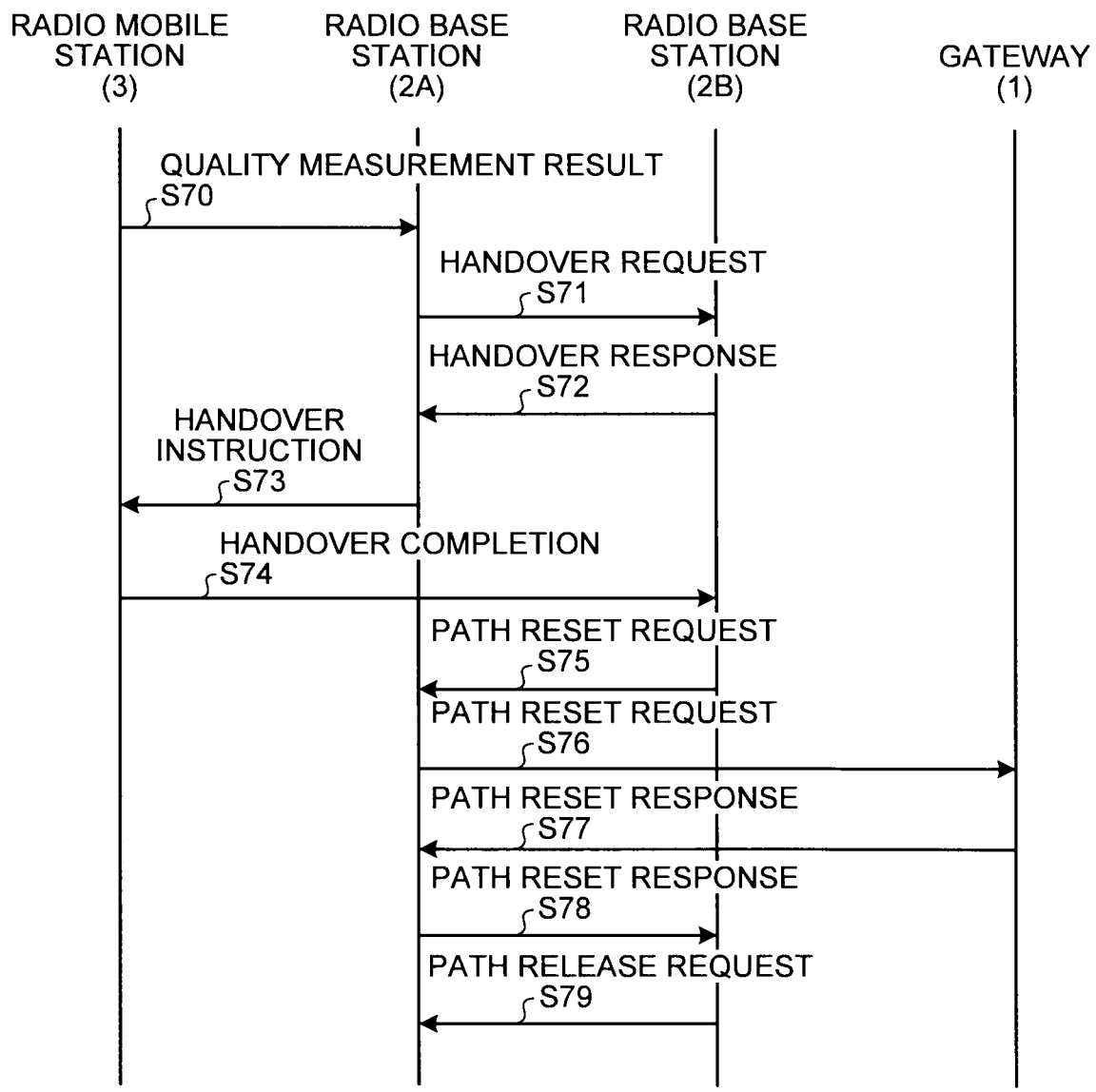

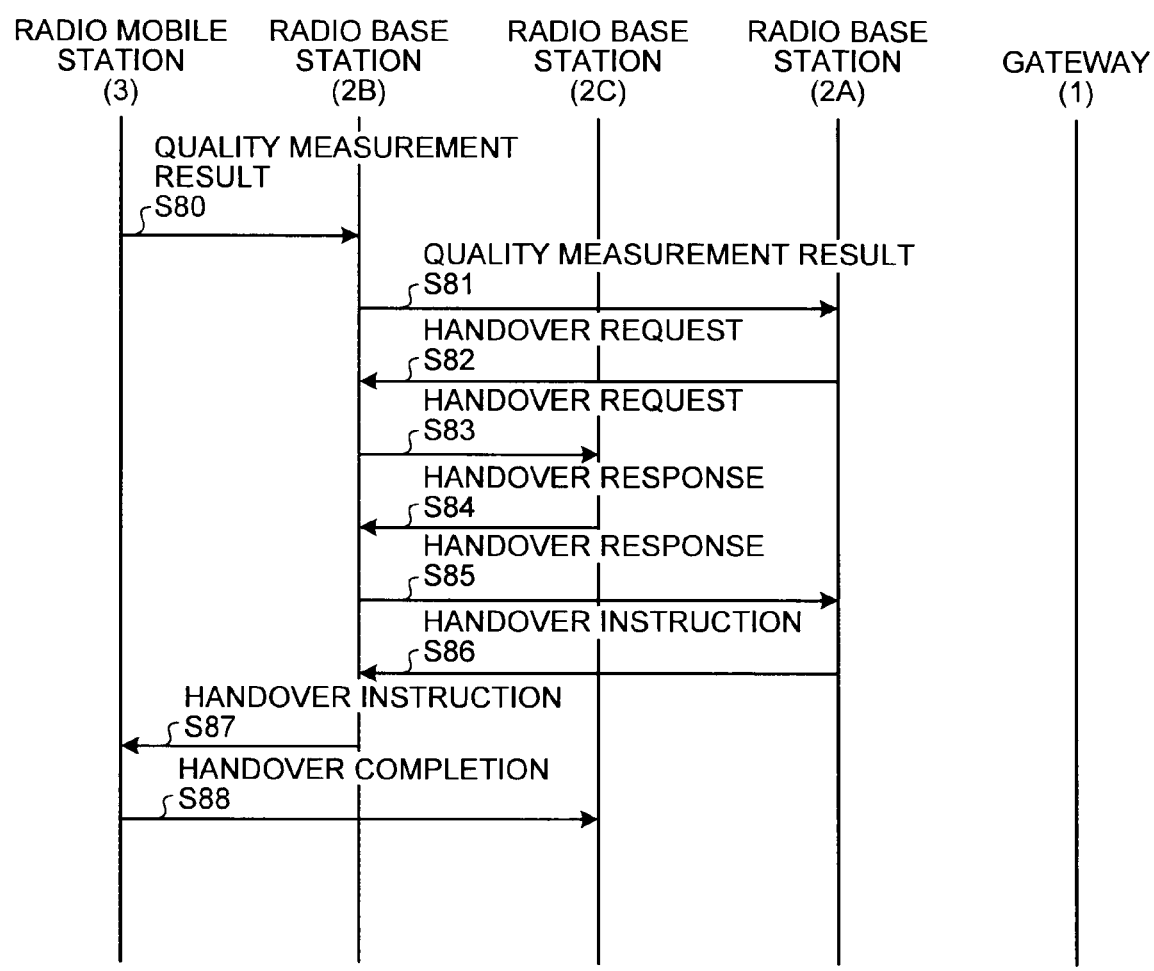

COMMUNICATION CONTROL METHOD AND RADIO BASE STATION

FIELD

The present invention relates to a communication control method and a radio base station used in a multi-hop cellular radio system formed by using a technology of an ad hoc network.

BACKGROUND

As a method of delivering data, which is transmitted from a transmission terminal, to a reception terminal incapable of performing direct radio communication through multi-hop transfer by another radio communication terminal, there is a technology called ad hoc network. In the ad hoc network, it is known that a path between radio communication terminals that form a network is established by using a routing protocol such as DSR (Dynamic Source Routing) or AODV (Ad hoc On-Demand Distance Vector) between the terminals (see, for example, Non Patent Literature 1).

On the other hand, in packet exchange control standardized in the 3GPP (3rd Generation Partnership Project), an individual channel for communication sets a radio network controller (RNC) used in first communication establishment as an anchor point and performs control for extending a routing path for data from the anchor point (see Non Patent Literature 2).

In LTE (Long Term Evolution) also standardized in the 3GPP, because the function of the RNC is shifted to an eNodeB, a system for moving the anchor point during handover and switching a data transfer path is adopted (see Non Patent Literature 3).

Patent Literature 1 describes a technology for comparing the number of hops in a routing path in each data transmission and reception generated between specific terminals to thereby detect that a routing path becomes redundant based on an increase in the number of hops and performing, based on the detection, optimization of the routing path and a change of an anchor router (an anchor point). As a method of counting the number of hops, a method employing a TTL (Time to Live) parameter in IPv4 or a hop limit parameter in IPv6 is disclosed.

CITATION LIST

Patent Literature

Patent Literature 1: Japanese Patent Application Laid-open No. 2003-224589

Non Patent Literature

Non Patent Literature 1: C-K. Toh, translated by Kozo Keikaku Engineering Inc., "Ad Hoc Mobile Wireless Network—Protocol and System—" Kyoritsu Shuppan Co., Ltd. (2003)
Non Patent Literature 2: 3GPP TS25.832 "Manifestations of Handover and SRNS relocation"
Non Patent Literature 3: 3GPP TS23.401 V8.3.0 "General Packet Radio Service (GPRS) enhancements for Evolved Universal Terrestrial Radio Access Network (E-UTRAN) access"

SUMMARY

Technical Problem

As one of forms for applying the technology of the ad hoc network to a cellular radio system, a radio relay between base stations is conceivable. This is realized by performing multi-hop transfer through a radio relay by another base station between a base station that handles mobile stations and a core network.

However, when this technology is applied to the LTE or a cellular radio system in future, it is necessary to perform radio resource control and movement control and select one base station set as an anchor point out of base stations on a multi-hop path. In this case, when a cellular network managing function is imparted to a base station closest to a mobile station every time the mobile station moves, there is caused a problem that a control packet for transferring a context of the mobile station is generated and radio resources among the base stations are consumed.

On the other hand, when the cellular network managing function is fixed to a base station closest to a core network, the problem involved in the context transfer does not occur. However, there is a problem in that loads are concentrated on the base station having the cellular network managing function because the base station handles a large number of mobile stations. When the cellular network managing function is fixed to a base station to which the mobile station makes a connection first and a system for extending a path during movement is adopted, because a radio resource for transfer is necessary, there is a problem in that radio resources among the base stations are wastefully consumed.

The present invention has been devised in view of the above and it is an object of the present invention to obtain a communication control method and a radio base station for improving efficiency of a switching opportunity for a cellular network managing function, which is a problem in realizing a multi-hop cellular radio system.

Solution to Problem

In order to solve the aforementioned problems, a communication control method according to one aspect of the present invention, which is executed in a multi-hop cellular network including at least one gateway and a plurality of radio base stations having a cellular network managing function for performing radio resource management and movement management for a radio mobile station, includes: a first radio base station that is performing the radio resource management and the movement management concerning the radio mobile station connected to the multi-hop cellular network among the radio base stations requesting, when the first radio base station determines that it is necessary to switch a connection destination of the radio mobile station, a second radio base station serving as a radio base station at a handover destination to perform handover processing and instructing the radio mobile station (a handover execution mobile station) to perform handover to the second radio base station; and the second radio base station determining, based on a number of times of transfer until a signal transmitted from the first radio base station reaches the own station in the instructing handover, whether to change the radio base station that performs the radio resource management and the movement management concerning the handover execution mobile station.

Advantageous Effects of Invention

In the communication control method according to the present invention, the radio base station at a handover destination determines, based on the number of times of message transfer from a radio base station that is providing a radio mobile station, which executes handover, with a cellular network managing function to the own station, whether to change the radio base station that provides the radio mobile station with the cellular network managing function. Therefore, there is an effect that it is possible to improve efficiency of a switching opportunity for the cellular network managing function and prevent radio resources from being consumed more than necessary.

BRIEF DESCRIPTION OF DRAWINGS

FIG. 10 is a diagram of a sequence in which a radio mobile station switches a connection destination.

FIG. 11 is a diagram of connection state management information.

FIG. 12 is a diagram of a sequence in which a radio mobile station switches a connection destination.

FIG. 13 is a diagram of connection state management information.

FIG. 14 is a diagram of a sequence in which a radio mobile station switches a connection destination.

REFERENCE SIGNS LIST 1, 1X, 1Y GATEWAYS
2A, 2B, 2C, 2D RADIO BASE STATIONS
3 RADIO MOBILE STATION
11 WIRED I/F UNIT
12, 21, 31 WIRELESS I/F UNITS
13, 22, 32 CONTROL-MESSAGE PROCESSING UNITS
14, 23 PATH CONTROL UNITS
15, 24 RESOURCE CONTROL UNITS
25 MOVEMENT CONTROL UNIT
33 QUALITY MEASURING UNIT
100A COMMUNICATION AREA

DESCRIPTION OF EMBODIMENTS

Embodiments of a communication control method and a radio base station according to the present invention are explained in detail below based on the drawings. The present invention is not limited by the embodiments.

First Embodiment

Figure 1:
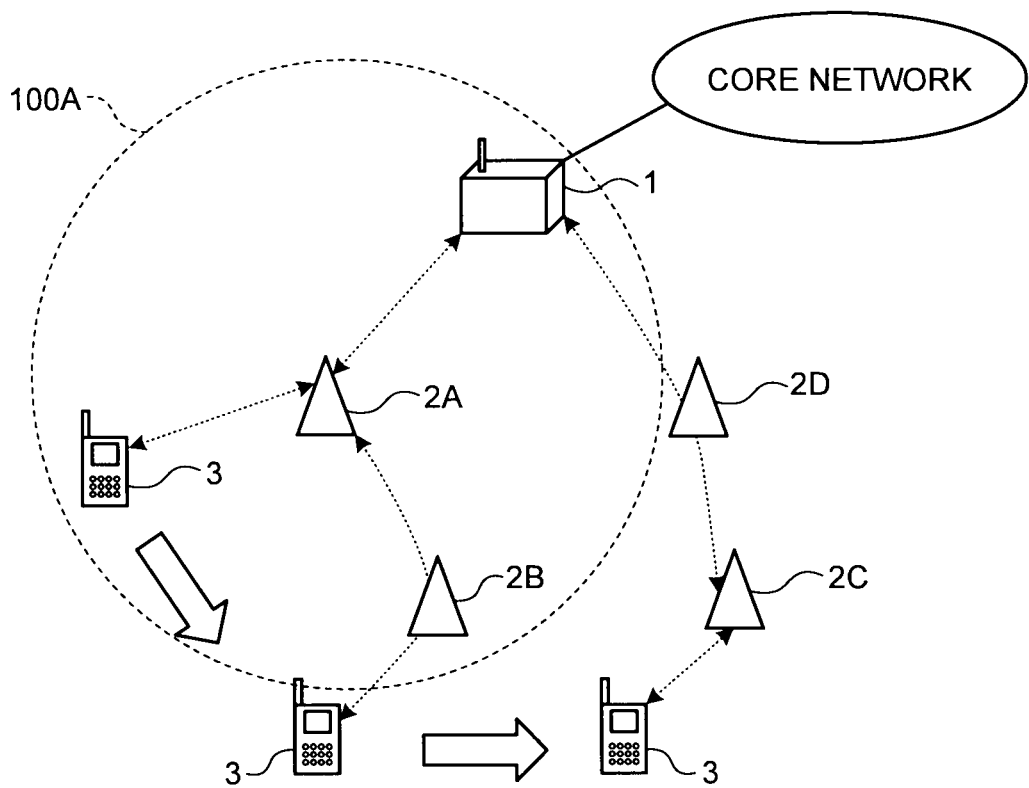
FIG. 1 is a diagram of an example of a multi-hop network to which a communication control method according to a first embodiment is applied.

FIG. 1 is a diagram of a multi-hop cellular network (a multi-hop cellular radio system) to which the communication control method according to the present invention is applied. This system includes a gateway 1, radio base stations 2A, 2B, 2C, and 2D, and a radio mobile station 3.

In FIG. 1, the gateway 1 includes a connection interface with a core network and relays traffic between the multi-hop cellular network and the core network. The radio base stations 2A to 2D perform a radio relay between the gateway 1 and the radio mobile station 3 to deliver data transmitted by the radio mobile station 3 to the gateway 1 and deliver data transmitted by the gateway 1 to the radio mobile station 3. The radio base stations have a cellular network managing function for carrying out management of radio resources and movement management on the radio mobile station 3. However, all the radio base stations do not need to provide one radio mobile station 3 with the cellular network managing function. Any one of the radio base stations on a path from the radio mobile station 3 to the gateway provides the cellular network managing function. The radio mobile station 3 makes a connection to any one of the radio base stations and performs data communication.

In FIG. 1, examples of a moving path of the radio mobile station 3, a connection relation with a radio base station on the moving path (a radio base station with which the radio mobile station 3 directly communicates), and a connection relation (a data transfer path) from the radio base station with which the radio mobile station 3 directly communicates (a connected radio base station) to a core network are also shown. Specifically, a situation in which the radio mobile station 3 starts movement from a state in which the radio mobile station 3 is connected to the radio base station 2A and switches a connection destination to the radio base stations 2B and 2C and an example of a data transfer path at that point are shown. The data transfer path is indicated by a bidirectional arrow of a dotted line. A radio base station located at the start point (the end point) of this arrow provides a radio mobile station, which that communicates with the core network using the path, with the cellular network managing function.

In FIG. 1, a range in which the radio base station 2A can communicate with other nodes (the radio mobile station, the other radio base stations, and the gateway) by radio is shown as a communication area 100A. In the case of the configuration shown in FIG. 1, the radio base station 2A can directly communicate with the radio base station 2B and the gateway 1. Communication areas of the other radio base stations are not shown for simplification. However, the radio base station 2B is arranged in a place where the radio base station 2B can communicate with the radio base stations 2A and 2C and the radio base station 2C is arranged in a place where the radio base station 2C can communicate with the radio base stations 2B and 2D. The radio base station 2D is arranged in a place where the radio base station 2D can communicate with the radio base station 2C and the gateway 1. The radio base stations manage a path table for transferring data to the gateway 1 created using, for example, a routing protocol of an existing ad hoc network.

Figure 2:
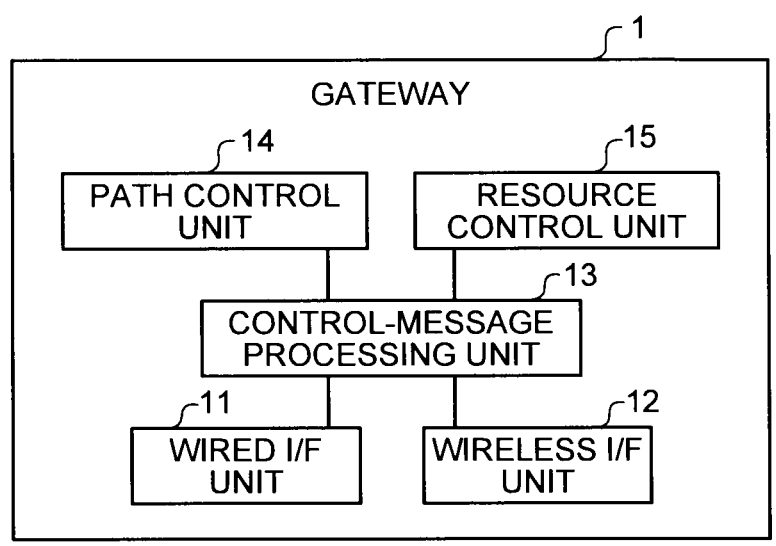
FIG. 2 is a diagram of a configuration example of a gateway.

FIG. 2 is a diagram of a configuration example of the gateway 1. As shown in the figure, the gateway 1 includes a wired I/F unit 11 for communicating with the core network, a wireless I/F unit 12 for communicating with the radio base stations or the radio mobile station, a control-message processing unit 13 for processing messages transmitted and received by the wired I/F unit 11 or the wireless I/F unit 12, a path control unit 14 for determining a path for transmitting a control message, and a resource control unit 15 for managing connection information of the mobile station.

Figure 3:
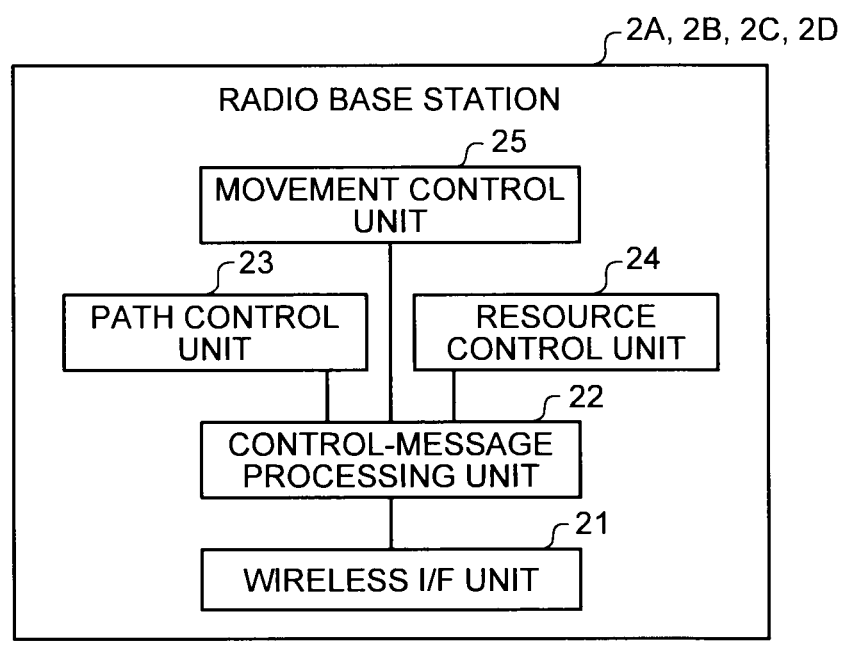
FIG. 3 is a diagram of a configuration example of a radio base station.

The radio base stations 2A to 2D have the same configuration. In the following explanation, when it is not specifically necessary to distinguish the radio base stations 2A to 2D, these are generally referred to as radio base station 2. FIG. 3 is a diagram of a configuration example of the radio base station 2. As shown in the figure, the radio base station 2 includes a wireless I/F unit 21 for communicating with the other radio base stations 2, the radio mobile station 3, or the gateway 1, a control-message processing unit 22 for processing messages transmitted and received by the wireless I/F unit 21, a path control unit 23 for determining a path for transmitting a control message, a resource control unit 24 for performing radio resource management, and a movement control unit 25 for handling movement of the radio mobile station 3 when the radio base station 2 becomes a radio base station that provides the radio mobile station 3 with a cellular network managing function.

Figure 4:
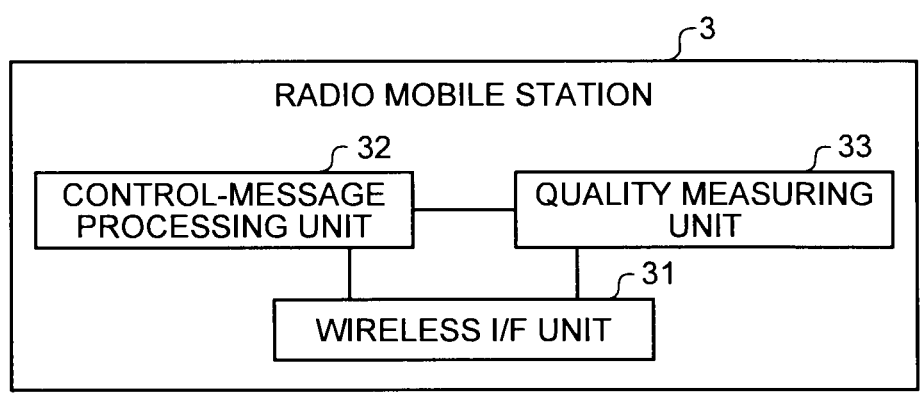
FIG. 4 is a diagram of a configuration example of a radio mobile station.

FIG. 4 is a diagram of a configuration example of the radio mobile station 3. The radio mobile station 3 includes a wireless I/F unit 31 for communicating with the radio base station 2 or the gateway 1, a control-message processing unit 32 for processing messages transmitted and received by the wireless I/F unit 31, and a quality measuring unit 33 for measuring the quality of communication with the radio base station 2 around the radio mobile station 3.

In FIGS. 2 to 4, only components necessary for realizing characteristic operations of this embodiment are shown. Other general components are not shown.

Characteristic operations in the multi-hop cellular network according to this embodiment, i.e., operations performed when the radio mobile station 3 moves and switches the radio base station 2 at a connection destination (the radio base station 2 with which the radio mobile station 3 directly communicates) are explained. As an example, operations performed when the radio mobile station 3 moves as shown in FIG. 1 are explained. Specifically, operations performed when the radio mobile station 3 makes a connection to the radio base station 2A, sets, as an initial state, a state in which a data transfer path between the radio mobile station 3 and the core network is set through the radio base station 2A and the gateway 1, and, thereafter, switches a connection destination to the radio base stations 2B and 2C in this order according to the movement are explained. An operation of the radio mobile station 3 for switching the connection destination from the radio base station 2A to the radio base station 2B (a first control procedure) and an operation of the radio mobile station 3 for switching the connection destination from the radio base station 2B to the radio base station 2C (a second control procedure) are separately explained. In the initial state, the radio base station 2A provides the radio mobile station 3 with the cellular network managing function.

(First Control Procedure)

Figure 5:
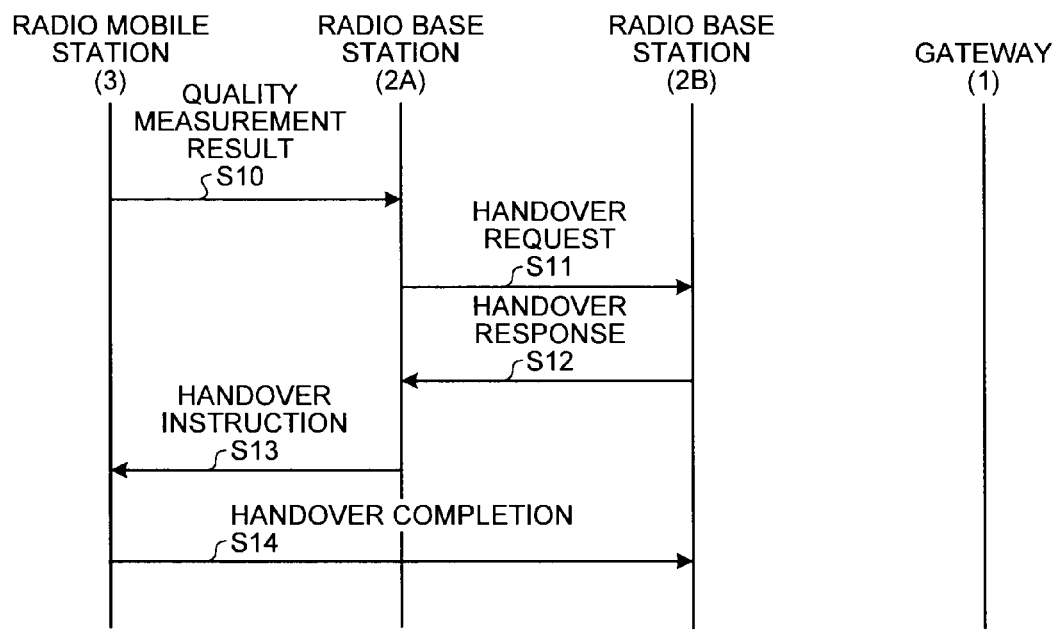
FIG. 5 is a diagram of a sequence in which the radio mobile station switches a connection destination.

FIG. 5 is a diagram of a sequence in which the radio mobile station 3 executes handover and switches the connection destination from the radio base station 2A (the initial state) to the radio base station 2B. In FIG. 5, only transmission and reception operations for control messages are shown and transmission and reception operations for data are not shown. In the following explanation, "handover" indicates an operation for switching a radio base station at a connection destination such that communication can be performed through a radio base station at a moving destination when a radio base station moves to a communication area of a radio base station different from a radio base station to which the radio mobile station is connected.

In the radio mobile station 3, when the radio mobile station 3 is already connected to any one of the radio base stations 2, the quality measuring unit 33 measures communication quality at predetermined timing. The control-message processing unit 32 generates a control message including a result of the measurement (communication quality) and transmits, as a quality measurement result, the generated message to the radio base station 2, to which the radio mobile station 3 is connected, through the wireless I/F unit 31.

In the initial state, as shown in FIG. 5, the radio mobile station 3 transmits the quality measurement result message to the radio base station 2A (a radio base station at an anchor point) that is providing the cellular network managing function (step S10). In FIG. 5, for convenience of explanation, only one of quality measurement result messages transmitted periodically or non-periodically is shown.

When the radio base station 2A, which is a destination of the quality measurement result message, receives the quality measurement result message, the radio base station 2A checks contents of the quality measurement result message. As a result, when the radio base station 2A determines that the communication quality is deteriorated and determines that handover for switching the connection destination from the own station to another radio base station 2 is necessary, the radio base station 2A transmits a handover request message to the radio base station 2B at a handover destination (step S11). At this point, the radio base stations 2 that relay the handover request message perform transfer after recording the number of times of message transfer in the handover request message. For example, a predetermined area for recording the number of times of transfer is secured in the handover request message. The radio base station 2 that generates the handover request message records an initial value (0, 1, etc.) as the number of times of transfer. When the radio base stations 2 transfer the handover request message, the radio base stations 2 update (increment) number-of-times-of-transfer information. Consequently, the radio base station 2 at a destination of the handover request message can learn how many times the handover request message is transferred to reach the radio base station 2. In this example, the radio base station 2B at the handover destination detects that the handover request message is transferred once (the message directly reaches the radio base station 2B from the radio base station 2A at the issue source not through other radio base station 2).

Each of the radio base stations 2 according to this embodiment included in the multi-hop cellular network shown in FIG. 1 stores a largest number of hops (a threshold) between the radio base station 2 that provides the radio mobile station 3 connected to the own apparatus with the cellular network managing function and the own apparatus. When each of the radio base stations 2 functions as a radio base station at the handover destination and executes handover processing, the radio base station 2 compares the number of times of transfer of the handover request message and the threshold (the maximum number of hops). If the number of times of transfer reaches the threshold, the radio base station 2 also executes processing for changing the radio base station that provides the cellular network managing function. On the other hand, if the number of times of transfer is smaller than the threshold, the radio base station 2 does not perform the processing for changing the radio base station that provides the cellular network managing function.

Referring back to the sequence shown in FIG. 5, when the radio base station 2B receives the handover request message transmitted at step S11, the radio base station 2B compares the number of times of transfer recorded in the handover request message and the stored maximum number of hops (the threshold). The radio base station 2B confirms that the number of times of transfer is smaller than the threshold and determines not to change the radio base station that provides the cellular network managing function. The radio base station 2B sets a path for transfer between the radio base station 2B and the radio base station 2A at the handover source and transmits a handover response message to the radio base station 2A (step S12).

The radio base station 2A that receives the handover response message transmits a handover instruction message to the radio mobile station 3 and instructs handover to the radio base station 2B (step S13). When the radio mobile station 3 receives the handover instruction message, the radio mobile station 3 switches the connection destination from the radio base station 2A to the radio base station 2B according to instruction contents of the handover instruction message and then transmits a handover completion message to the radio base station 2B (step S14).

According to the control procedure explained above, the handover from the radio base station 2A to the radio base station 2B (handover not involving a change of the radio base station that provides the cellular network managing function) is completed. Thereafter, the radio mobile station 3 performs communication (transmission and reception of data) with the gateway 1 through the radio base station 2B. At this point, as shown in FIG. 1, traffic transmitted and received between the radio mobile station 3 and the gateway 1 passes through the radio base station 2A as well. In other words, the communication is performed through a communication path (a data transfer path) of the radio mobile station 3, the radio base station 2B, the radio base station 2A, and the gateway 1.

In the operations explained above, when the radio mobile station 3 measures communication quality, the radio mobile station 3 always performs notification of a result of the measurement to the radio base station 2. However, it is not always necessary to transmit the measurement result of the communication quality to a radio base station connected to the radio mobile station 3. For example, the radio mobile station 3 can notify the measurement result when the radio mobile station 3 determines that the communication quality is deteriorated to some degree (to quality equal to or lower than predetermined quality) or can notify the measurement result when the radio mobile station 3 is requested from a radio base station. Alternatively, the radio mobile station 3 can notify the measurement result in one of the cases (when the communication quality is equal to or lower than the predetermined quality or the radio mobile station 3 is requested from a radio base station). The radio mobile station 3 can change a notification frequency (notification timing) according to the communication quality and notify the measurement result at a long cycle in the case of high quality and, on the other hand, notify the measurement result at a short cycle in the case of low quality. Further, if moving speed can be detected, the radio mobile station 3 can changes the notification frequency taking into account the moving speed. In this way, when it is estimated that the communication quality is satisfactory and necessity of handover is low or when the radio mobile station 3 is not moving (or moving at low speed), it is possible to reduce traffic between the radio mobile station 3 and the radio base station 2 by reducing the notification frequency of the quality measurement result.

(Second Control Procedure)

Figure 6:
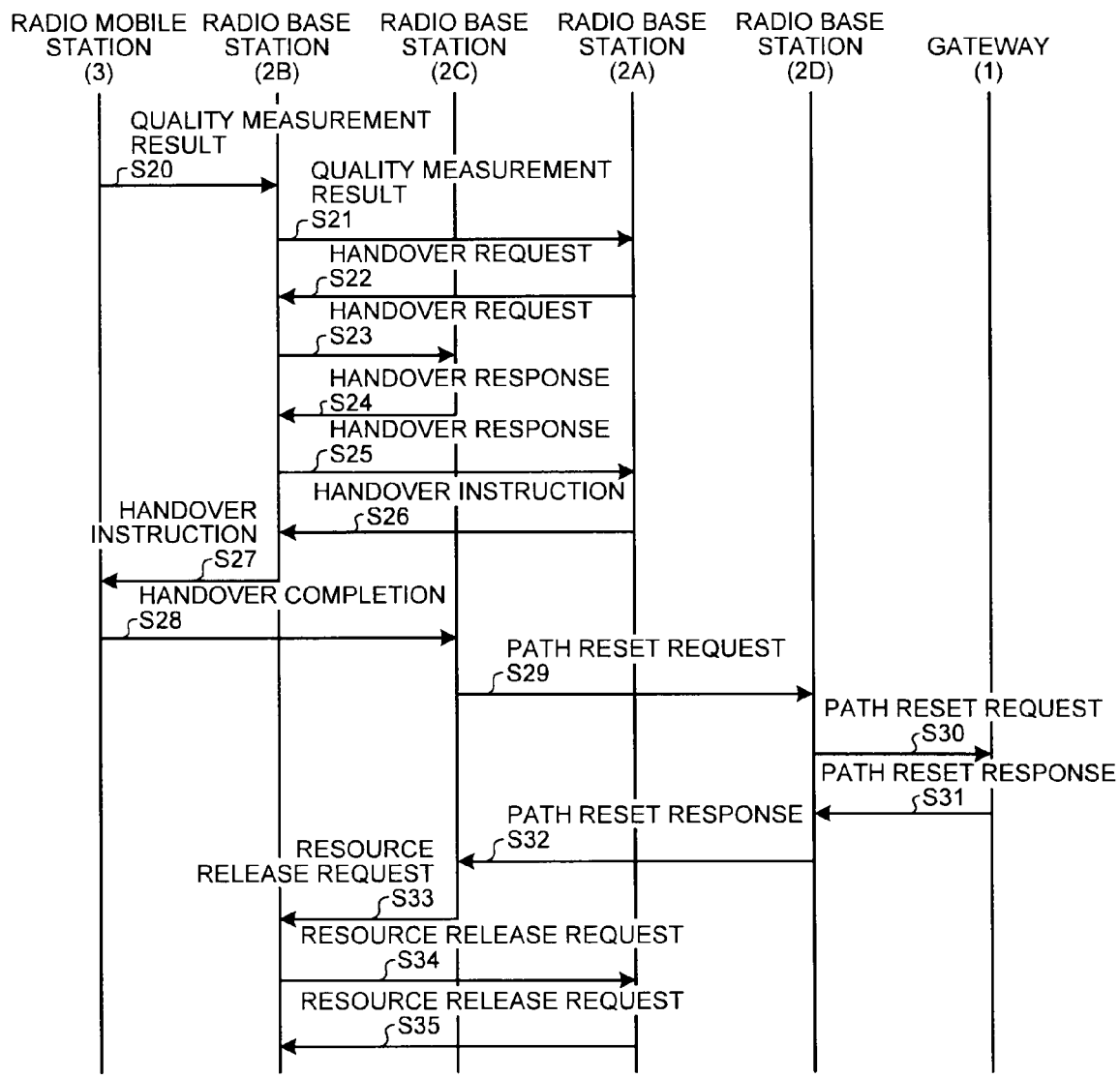
FIG. 6 is a diagram of a sequence in which the radio mobile station switches a connection destination.

FIG. 6 is a diagram of a sequence in which the radio mobile station 3 executes handover and switches a connection destination from the radio base station 2B to the radio base station 2C. Unlike the first control procedure, this sequence indicates handover involving a change of the radio base station that provides the cellular network managing function (the radio base station at the anchor point), i.e., a second control procedure. As in FIG. 5, in FIG. 6, transmission reception operations for data are not shown.

In a state in which the connection destination is switched from the radio base station 2A and the radio base station 2B and the radio mobile station 3 is connected to the radio base station 2B, as shown in FIG. 6, the radio mobile station 3 also transmits a quality measurement result message to the radio base station 2A that is providing the cellular network managing function. Specifically, first, the quality measurement result message is transmitted from the radio mobile station 3 to the radio base station 2B (step S20) and further transferred from the radio base station 2B to the radio base station 2A (step S21). In FIG. 6, for convenience of explanation, only one of quality measurement result messages transmitted periodically or non-periodically is shown.

When the radio base station 2A, which is the destination of the quality measurement result message, receives the quality measurement result message, the radio base station 2A checks contents of the quality measurement result message. As a result, when the radio base station 2A determines that communication quality is deteriorated and determines handover for switching the connection destination from the radio base station 2B to the radio base station 2C is necessary, the radio base station 2A transmits a handover request message to the radio base station 2C at a handover destination (steps S22 and S23). This message reaches the radio base station 2C through the radio base station 2B. At this point, the radio base stations 2 that relay the handover request message perform transfer after recording the number of times of message transfer in the handover request message. Consequently, the radio base station 2C at a destination of the handover request message can learn how many times the handover request message is transferred to reach the radio base station 2C. In this example, the radio base station 2C at the handover destination detects that the handover request message is transferred twice.

The radio base station 2C compares the detected number of times of transfer and a maximum number of hops determined in advance (a threshold same as that explained in the first control procedure). It is assumed that the radio base station 2C confirms that the condition of the number of times of transfer<the threshold is not satisfied (the number of times of transfer≧the threshold). In other words, the radio base station 2C determines to change the radio base station that provides the cellular network managing function. The radio base station 2C returns a handover response message to the radio base station 2A (steps S24 and S25). This message reaches the radio base station 2A through the radio base station 2B.

The radio base station 2A that receives the handover response message transmits a handover instruction message to the radio mobile station 3 and instructs handover to the radio base station 2C (steps S26 and S27). This message reaches the radio mobile station 3 through the radio base station 2B. When the radio mobile station 3 receives the handover instruction message, the radio mobile station 3 switches the connection destination from the radio base station 2B to the radio base station 2C according to instruction contents of the handover instruction message and then transmits a handover completion message to the radio base station 2C (step S28).

The radio base station 2C that receives the handover completion message transmits a path reset request message to the gateway 1 to reset a path for transferring data of the radio mobile station 3 between the radio base station 2C and the gateway 1 (steps S29 and S30). This message reaches the gateway 1 through the radio base station 2D.

In the gateway 1 that receives the path reset request message, the path control unit 14 performs reset processing for a data transfer path of the radio mobile station 3. When the setting is completed, the control-message processing unit 13 generates a path reset response message including information concerning the reset data transfer path and returns the path reset response message to the radio base station 2C through the wireless I/F unit 12 (steps S31 and S32). This message reaches the radio base station 2C through the radio base station 2D.

The radio base station 2C that receives the path reset response message transmits a resource release request message to the radio base station 2A to release a data transfer path between the radio base station 2A that has been providing the radio mobile station 3 with the cellular network managing function and the radio base station 2B to which the radio mobile station 3 is connected before the handover (to release a path not included in the data transfer path after the reset among paths included in the data transfer path before the reset) (steps S33 and S34). This message reaches the radio base station 2A through the radio base station 2B.

In the radio base station 2A that receives the resource release request message, the resource control unit 24 releases resources concerning the radio mobile station 3 and the control-message processing unit 22 generates a resource release request message for requesting release of the data transfer path and transmits, through the wireless I/F unit 21, the resource release request message to the radio base station 2B to which the radio mobile station 3 is connected before the handover (step S35).

The radio base station 2B that receives the resource release request message releases the resources concerning the radio mobile station 3.

According to the control procedure, the handover from the radio base station 2B to the radio base station 2C and the switching processing for the data transfer path involved in the handover (handover involving a change of the radio base station that provides the cellular network managing function) are completed. Thereafter, the radio mobile station 3 communicates with the gateway 1 through the radio base station 2C. A communication path between the radio mobile station 3 and the gateway 1 in this state is a communication path of the radio mobile station 3, the radio base station 2C, the radio base station 2D, and the gateway 1 as shown in FIG. 1.

As explained above, in the multi-hop cellular radio system according to this embodiment, the radio base stations have the cellular network managing function. When the radio mobile station executes handover, a radio base station at a handover destination determines, based on the number of times of transfer (the number of hops) on a data transfer path from a radio base station that is providing the radio mobile station, which executes the handover, with the cellular network managing function to the own station, whether to change the radio base station that provides the radio mobile station with the cellular network managing function. Consequently, it is possible to suppress an execution frequency of path reset between the radio base station and the gateway. It is possible to reduce a processing time in switching a radio base station at a connection destination and reduce the number of control messages. As a result, it is possible to improve efficiency of a switching opportunity for the cellular network managing function and prevent radio resources from being consumed more than necessary.

In the above explanation, the radio base stations 2 transfer a message after recording the number of times of transfer of the message in the handover request message. The radio base station 2 at the handover destination compares the number of times of transfer recorded in the received handover request message and the threshold to thereby determine whether to switch the radio base station that provides the cellular network managing function. However, the radio base station 2 can perform the determination according to a method different from this.

For example, each of the radio base stations 2 recognizes in advance the radio base station 2 that provides the radio mobile station 3 connected to the own apparatus with the cellular network managing function. When the radio mobile station 3 that moves to under the own station (a communication area of the own station) is provided with the cellular network managing function from the radio base station 2 different from the one recognized in advance (the one determined in advance), the radio base station 2 switches the radio base station that provides the cellular network managing function.

A more specific example is explained. It is assumed that the radio base station 2B grasps that a radio base station that provides the radio mobile station 3 connected to the own apparatus (the radio base station 2B) with the cellular network managing function) is the radio base station 2A. It is also assumed that the radio base station 2C grasps that a radio base station that provides the radio mobile station 3 connected to the own apparatus (the radio base station 2C) with the cellular network managing function is the radio base station 2C (the own apparatus). Under such conditions, when the radio mobile station 3 provided with the cellular network managing function from the radio base station 2A moves to under the radio base station 2B, the radio base station 2B does not change the radio base station that provides the cellular network managing function (performs handover processing in the same control procedure as the sequence shown in FIG. 5). Thereafter, when the radio mobile station 3 under the radio base station 2B moves to under the radio base station 2C, because the radio base station 2A provides the radio mobile station 3 moving to under the radio base station 2C with the cellular network managing function and is not a radio base station determined in advance, the radio base station 2C changes the radio base station that provides the cellular network managing function (performs handover processing in the control procedure same as the sequence shown in FIG. 6).

When it is determined according to such a procedure whether to switch the radio base station that provides the cellular network managing function, it is possible to improve efficiency of a switching opportunity for the cellular network managing function and prevent radio resources from being consumed more than necessary.

Second Embodiment

A communication control method according to a second embodiment is explained. In the first embodiment, the control operation performed when the single (fixed) gateway communicates with the core network is explained. In the second embodiment, an example of an operation performed when a plurality of gateways are present and the gateways are also switched when a data transfer path is switched according to handover is explained.

Figure 7:
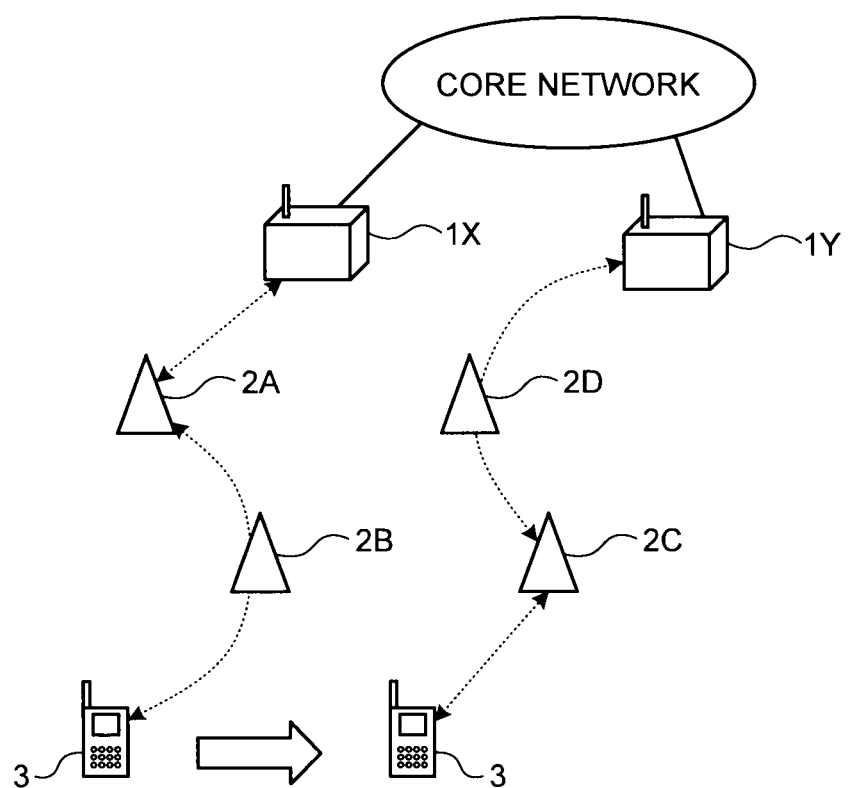
FIG. 7 is a diagram of an example of a multi-hop cellular network to which a communication control method according to a second embodiment is applied.

FIG. 7 is a diagram of an example of a multi-hop cellular network to which the communication control method according to the second embodiment is applied. This system includes gateways 1X and 1Y, the radio base stations 2 (2A, 2B, 2C, and 2D), and the radio mobile station 3. These components have internal configurations same as those of the components explained in the first embodiment. The configuration of the gateways 1X and 1Y is the configuration shown in FIG. 2. The configuration of the radio base stations 2A to 2D is the configuration shown in FIG. 3. The configuration of the radio mobile station 3 is the configuration shown in FIG. 4. However, a control operation performed when the radio mobile station 3 performs handover is partially different from the control operation explained in the first embodiment (see FIGS. 5 and 6).

In FIG. 7, as in FIG. 1 used in the explanation of the first embodiment, examples of a moving path of the radio mobile station 3, a connection relation with a radio base station on the moving path (a radio base station with which the radio mobile station 3 directly communicates), and a connection relation (a data transfer path) from the radio base station with which the radio mobile station 3 directly communicates to a core network are also shown. Specifically, a situation in which the radio mobile station 3 starts movement from a state in which the radio mobile station 3 is connected to the radio base station 2B and switches a connection destination to the radio base station 2C and an example of a data transfer path at that point are shown. The data transfer path is indicated by a bidirectional arrow of a dotted line. A radio base station located at the start point (the end point) of this arrow provides a radio mobile station that communicates with the core network using the path with the cellular network managing function.

In this embodiment, a control procedure performed when a state in which the radio mobile station 3 makes a connection to the radio base station 2B, a data transfer path between the radio mobile station 3 and the core network is set through the radio base station 2A and the gateway 1X, and the radio mobile station 3 is provided with the cellular network managing function from the radio base station 2A is set as an initial state and the radio mobile station 3 moves from this initial state and switches (hands over) the connection destination to the radio base station 2C is explained. In the explanation, a base station at a provision source of the cellular network managing function is changed and a gateway at a connection point to the core network is also changed.

Figure 8:
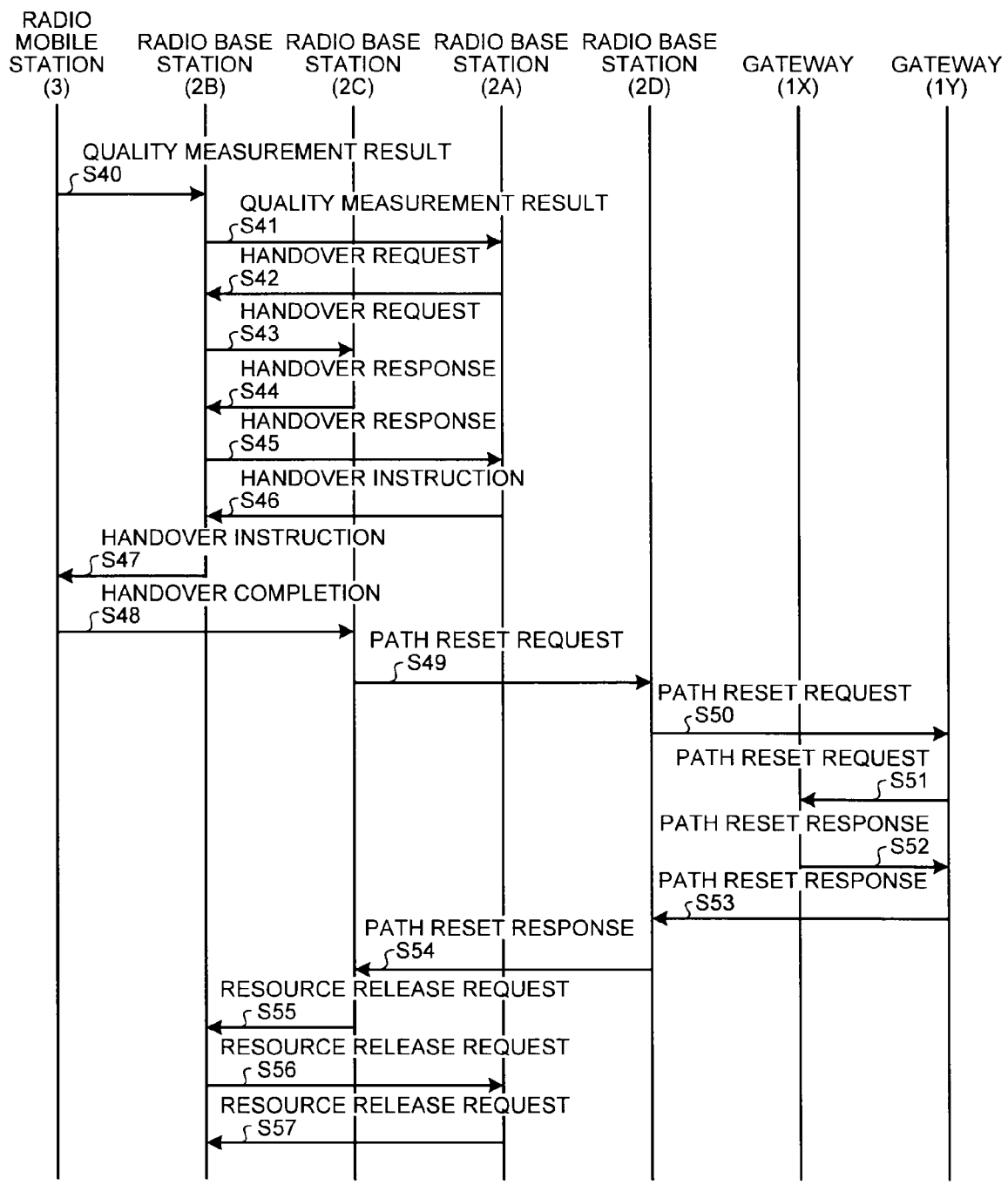
FIG. 8 is a diagram of a sequence in which a radio mobile station switches a connection destination.

The communication control method according to this embodiment is explained below based on FIG. 8. FIG. 8 is a diagram of an example of the communication control method according to the second embodiment. Specifically, FIG. 8 is a diagram of a sequence in which, in the multi-hop cellular network shown in FIG. 7, the radio mobile station 3 executes handover and switches the connection destination from the radio base station 2B (the initial state) to the radio base station 2C.

In the initial state, as shown in FIG. 8, the radio mobile station 3 transmits a quality measurement result message to the radio base station 2A that is providing the cellular network managing function (steps S40 and S41). This message reaches the radio base station 2A through the radio base station 2B. As in FIGS. 5 and 6 in which the control procedure in the first embodiment is shown, in FIG. 8, only one of quality measurement result messages transmitted periodically or non-periodically is shown.

When the radio base station 2A, which is a destination of the quality measurement result message, receives the quality measurement result message, the radio base station 2A checks contents of the quality measurement result message. As a result, when the radio base station 2A determines that the communication quality is deteriorated and determines that handover for switching the connection destination is necessary, the radio base station 2A transmits a handover request message to the radio base station 2C at a handover destination (steps S42 and S43). This message reaches the radio base station 2C through the radio base station 2B. At this point, the radio base stations 2 that relay the handover request message perform transfer after recording the number of times of message transfer in a handover request message. Consequently, the radio base station 2C at a destination of the handover request message can learn how many times the handover request message is transferred to reach the radio base station 2C. In this example, the radio base station 2C at the handover destination detects that the handover request message is transferred twice.

The radio base station 2C compares the detected number of times of transfer and a maximum number of hops determined in advance (a threshold same as the threshold explained in the first embodiment). The radio base station 2C confirms that the condition of the number of times of transfer<the threshold is not satisfied (the number of times of transfer≥the threshold) and determines to change the radio base station that provides the cellular network managing function. The radio base station 2C returns a handover response message (steps S44 and S45). This message reaches the radio base station 2A through the radio base station 2B.

The radio base station 2A that receives the handover response message transmits a handover instruction message to the radio mobile station 3 and instructs handover to the radio base station 2C (steps S46 and S47). This message reaches the radio mobile station 3 through the radio base station 2B. When the radio mobile station 3 receives the handover instruction message, the radio mobile station 3 switches the connection destination from the radio base station 2B to the radio base station 2C according to instruction contents of the handover instruction message and then transmits a handover completion message to the radio base station 2C (step S48). The processing at steps S40 to S48 is the same as the processing at steps S20 to S28 explained in the first embodiment.

Each of the radio base stations 2 determines in advance and grasps a gateway used (communicated) in providing the radio mobile station 3 with the cellular network managing function. The radio base station 2C is associated with the gateway 1Y (determined to use the gateway 1Y).

Therefore, the radio base station 2C that receives the handover completion message from the radio mobile station 3 at step S48 transmits a path reset request message to the gateway Y1 associated with the radio base station 2C to reset a path (a data transfer path) in the multi-hop cellular network (steps S49 and S50). This message reaches the gateway 1Y through the radio base station 2D.

The gateway 1Y that receives the path reset request message sets a data transfer path of the radio mobile station 3 and transmits a path reset request message for gateway switching to the gateway 1X in which a data transfer path with the radio mobile station 3 has been set (step S51). When the gateway 1X receives the path reset request message from the gateway 1Y, the gateway 1X releases resources concerning the radio mobile station 3 and returns a path reset response message (step S52).

When the gateway 1Y receives the path reset response message from the gateway 1X, the gateway 1Y returns a path reset response message, which is a response to the path reset request received at step S50, to the radio base station 2C (steps S53 and S54). This message reaches the radio base station 2C through the radio base station 2D. Information concerning the reset data transfer path is included in this message.

The radio base station 2C that receives the path reset response message transmits a resource release request message to the radio base station 2A to release a data transfer path between the radio mobile station 3 and the core network used before the reset (steps S55 and S56). This message reaches the radio base station 2A through the radio base station 2B.

The radio base station 2A that receives the resource release request message releases the resources concerning the radio mobile station 3 and transmits a resource release request message to the radio base station 2B (step S57).

The radio base station 2B that receives the resource release request message releases the resources concerning the radio mobile station 3. The processing at steps S53 to S57 is the same as the processing at steps S31 to S35 explained in the first embodiment.

According to the control procedure explained above, the handover from the radio base station 2B to the radio base station 2C and the switching processing for the data transfer path involved in the handover (handover involving a change of the radio base station that provides the cellular network managing function and a change of a gateway) are completed. Thereafter, the radio mobile station 3 performs communication through the radio base station 2C and the gateway 1Y associated with the radio base station 2C. A communication path between the radio mobile station 3 and the core network in this state is a communication path of the radio mobile station 3, the radio base station 2C, the radio base station 2D, and the gateway 1Y as shown in FIG. 7.

In the above explanation, the radio base stations 2 transfer a message after recording the number of times of transfer of the message in the handover request message. The radio base station 2 at the handover destination determines based on the number of times of transfer whether to switch the radio base station that provides the cellular network managing function. However, it is also possible to use the method explained in the last part of the first embodiment. Specifically, each of the radio base stations 2 recognizes in advance the radio base station 2 that provides the radio mobile station 3 connected to the own apparatus with the cellular network managing function. When the radio mobile station 3 that moves to under the own station is provided with the cellular network managing function from the radio base station 2 different from the one recognized in advance, the radio base station 2 switches the radio base station that provides the cellular network managing function.

As explained above, in the multi-hop cellular radio system according to this embodiment, each of the radio base stations has the cellular network managing function and grasps in advance a gateway used when the radio base station provides the radio mobile station 3 with the cellular network managing function. When the radio mobile station executes handover, the radio base station at the handover destination determines, based on the number of times of transfer (the number of hops) on a data transfer path from a radio base station that is providing the radio mobile station, which executes the handover, with the cellular network managing function to the own station, whether to change the radio base station that provides the radio mobile station with the cellular network managing function. When the radio base station takes over an operation for providing the cellular network managing function, the radio base station requests a gateway associated with the radio base station itself (a gateway used when the radio base station provides the cellular network managing function) among the gateways present in the system. Consequently, even in the system in which the gateways connected to the core network are present, it is possible to improve efficiency of a switching opportunity for the cellular network managing function and prevent radio resources from being consumed more than necessary.

Third Embodiment

A communication control method according to a third embodiment is explained. In this embodiment, as in the first embodiment, an operation performed when a switching operation for a gateway is not performed when a data transfer path is switched is explained.

Figure 9:
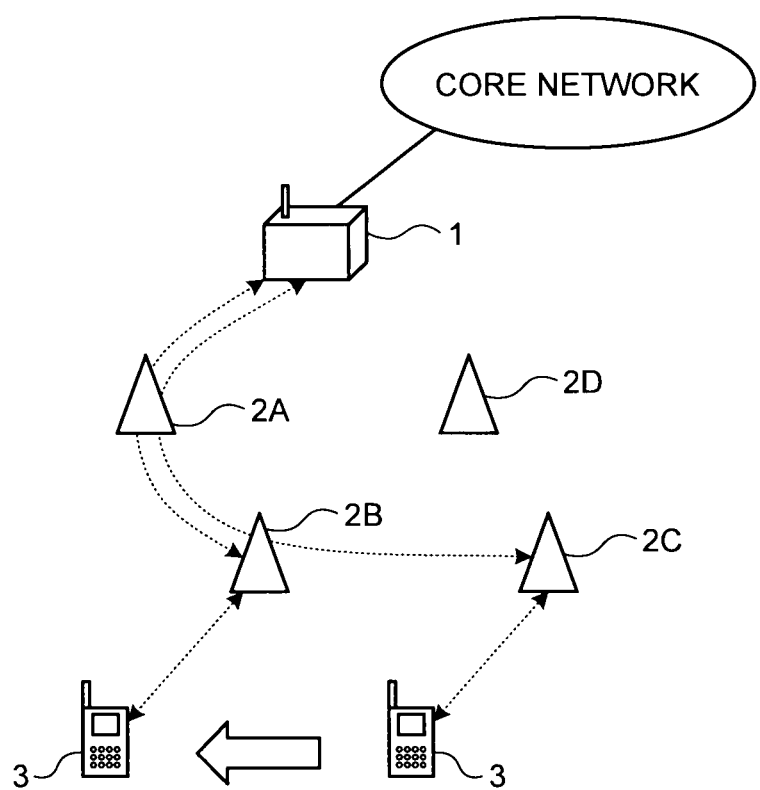
FIG. 9 is a diagram of an example of a multi-hop cellular network to which a communication control method according to a third embodiment is applied.

FIG. 9 is a diagram of an example of a multi-hop cellular network to which the communication control method according to the third embodiment is applied. This system includes the gateway 1, the radio base stations 2 (2A, 2B, 2C, and 2D), and the radio mobile station 3. These components have internal configurations same as those of the components explained in the first embodiment. However, a control operation performed when the radio mobile station 3 performs handover is partially different from the control operation explained in the first embodiment (see FIGS. 5 and 6).

In FIG. 9, as in FIG. 1 and the like used in the explanation of the first embodiment, examples of a moving path of the radio mobile station 3, a connection relation with a radio base station on the moving path (a radio base station with which the radio mobile station 3 directly communicates), and a connection relation (a data transfer path) from the radio base station with which the radio mobile station 3 directly communicates to a core network (the gateway 1) are also shown. Specifically, a situation in which the radio mobile station 3 starts movement from a state in which the radio mobile station 3 is connected to the radio base station 2C and switches a connection destination to the radio base station 2B and an example of a data transfer path at that point are shown. The data transfer path is indicated by a bidirectional arrow of a dotted line. A radio base station located at the start point (the end point) of this arrow provides a radio mobile station that communicates with the core network using the path with a cellular network managing function.

In this embodiment, a control procedure performed when a state in which the radio mobile station 3 makes a connection to the radio base station 2C, a data transfer path between the radio mobile station 3 and the core network is set through the radio base stations 2B and 2A and the gateway 1, and the radio mobile station 3 is provided with the cellular network managing function from the radio base station 2C is set as an initial state and the radio mobile station 3 moves from this initial state and switches (hands over) the connection destination to the radio base station 2B is explained. In this embodiment, a control procedure performed when an overlapping state of a data transfer path is checked and it is determined based on a result of the check whether to change a radio base station that provides the cellular network managing function is explained.

The communication control method according to this embodiment is explained below based on FIG. 10. FIG. 10 is a diagram of an example of a communication control procedure according to the third embodiment. Specifically, FIG. 10 is a diagram of a sequence in which, in the multi-hop cellular network shown in FIG. 9, the radio mobile station 3 executes handover and switches the connection destination from the radio base station 2C (the initial state) to the radio base station 2B.

In the initial state, as shown in FIG. 10, the radio mobile station 3 transmits a quality measurement result message to the radio base station 2C that is providing the cellular network managing function (step S60). As in FIGS. 5 and 6 and the like in which the control procedure in the first embodiment is shown, in FIG. 10, only one of quality measurement result messages transmitted periodically or non-periodically is shown.

When the radio base station 2C, which is a destination of the quality measurement result message, receives the quality measurement result message, the radio base station 2C checks contents of the quality measurement result message. As a result, when the radio base station 2C determines that the communication quality is deteriorated and determines that handover for switching the connection destination is necessary, the radio base station 2C transmits a handover request message to the radio base station 2B at a handover destination (step S61). The radio base station 2B that receives the handover request message returns a handover response message to the radio base station 2C (step S62). At this point, the radio base station 2B checks a data transfer path after the handover is ended and checks whether an overlapping section is included in the path. As a result of the check operation, when the radio base station 2B detects that an overlapping path is present, to remove the overlapping section, the radio base station 2B determines to change the radio base station that provides the cellular network managing function. If the radio base station 2B does not detect that an overlapping path is present, the operation of the radio base station 2B ends here (processing at step S62). In the example shown in FIG. 9, the radio base station 2B detects that an overlapping section is present. Specifically, a data transfer path immediately after the radio mobile station 3 performs handover is a transfer path of the gateway 1, the radio base station 2A, the radio base station 2B, the radio base station 2C, the radio base station 2B, and the radio mobile station 3. A path between the radio base station 2B and the radio base station 2C overlaps the data transfer path before the handover. Therefore, in this example, the radio base station 2B determines to change the radio base station that provides the cellular network managing function.

The radio base station 2C that receives the handover response message transmits a handover instruction message to the radio mobile station 3 and instructs handover to the radio base station 2B (step S63). When the radio mobile station 3 receives the handover instruction message, the radio mobile station 3 switches the connection destination from the radio base station 2C to the radio base station 2B according to contents of the instruction and then transmits a handover completion message to the radio base station 2B (step S64).

The radio base station 2B that receives the handover completion message transmits a path reset request message to the gateway 1 to reset a path for transferring data of the radio mobile station 3 between the radio base station 2B and the gateway 1 (steps S65 and S66). This message reaches the gateway 1 through the radio base station 2A.

The gateway 1 that receives the path reset request message performs reset of the data transfer path. When the setting is completed, the gateway 1 returns a path reset response message including information concerning the reset data transfer path to the radio base station 2B (steps S67 and S68). This message reaches the radio base station 2B through the radio base station 2A.

The radio base station 2B that receives the path reset response message transmits a resource release request message to the radio base station 2C to release a data transfer path between the radio mobile station 3 and the radio base station 2B that has been providing the radio mobile station 3 with the cellular network managing function (to release a path not included in the data transfer path after the reset among paths included in the data transfer path before the reset) (step S69). The radio base station 2C that receives the resource release request message releases resources concerning the radio mobile station 3.

According to the control procedure explained above, the handover from the radio base station 2C to the radio base station 2B and the switching processing for the data transfer path involved in the handover (handover involving a change of the radio base station that provides the cellular network managing function) are completed and the overlapping path is deleted.

As explained above, in the multi-hop cellular radio system according to this embodiment, each of the radio base stations has the cellular network managing function. When the radio base station executes handover, a radio base station at a handover destination checks whether an overlapping section is present in a data transfer path before and after the execution of the handover. When an overlapping section is present, the radio base station changes a radio base station that provides the cellular network managing function and deletes the overlapping section of the data transfer path. Consequently, it is possible to prevent radio resources from being consumed more than necessary. It is possible to suppress a transmission delay.

In this embodiment, to simplify the explanation, the radio base station at the handover destination checks whether an overlapping portion is present in the data transfer path before and after the execution of the handover and determines whether to change the radio base station that provides the cellular network managing function. However, the radio base station can also execute the determination operation based on the number of times of transfer explained in the first embodiment. In other words, when the number of times of transfer reaches a predetermined threshold or when an overlapping section is present in the data transfer path, the radio base station that provides the cellular network managing function can be changed. The control operation explained in this embodiment can also be applied to the reset operation for the data transfer path involving a change of a gateway explained in the second embodiment.

Fourth Embodiment

A communication control method according to a fourth embodiment is explained. In this embodiment, as in the first embodiment and the like, an operation performed when a switching operation for a gateway is not performed when a data transfer path is switched is explained. The configuration of a multi-hop cellular network according to this embodiment and internal configurations of components are the same as those in the first embodiment (see FIGS. 1 to 4).

The radio base station 2 according to this embodiment manages, concerning the radio mobile station 3 (in some case, a plurality of radio mobile stations 3) to which the radio base station 2 is providing a cellular network managing function, communication states (in communication or in non-communication) of the radio mobile station(s) 3 and, when the radio mobile station 3 moves and a radio base station at a connection destination is switched, executes a communication control operation corresponding to the managed communication states. The communication states of the radio mobile stations 3 are managed by, for example, a path control unit 23 (see FIG. 3). It goes without saying that a component (including one not shown in the figure) other than the path control unit 23 can control the communication states. "In communication" used in this embodiment and the next fifth embodiment indicates a state in which transmission and reception of data is performed between the radio mobile station 3 and a core network.

In this embodiment, a control procedure performed when a state in which the radio mobile station 3 makes a connection to the radio base station 2A, communicates with the core network through the gateway 1, and is provided with the cellular network managing function from the radio base station 2A is set as an initial state (see FIG. 1) and the radio mobile station 3 moves from this initial state and switches the connection destination to the radio base station 2B is explained. In the following explanation, it is assumed that the radio mobile station 3 moves from under the radio base station 2A to under the radio base station 2B while the radio mobile station 3 is in non-communication.

A control procedure performed when the radio mobile station 3 in non-communication switches a connection destination, i.e., a control procedure performed when the radio mobile station 3 in the initial state moves from under the radio base station 2A to under the radio base station 2B when the radio base station 2A stores connection state management information shown in FIG. 11 is explained with reference to FIG. 12. FIG. 11 is a diagram of an example of connection state management information (information concerning a communication state of the radio mobile station that is providing the cellular network managing function) managed by the radio base station 2A. FIG. 12 is a diagram of a sequence in which the radio mobile station 3 in non-communication moves from under the radio base station 2A to under the radio base station 2B and switches a connection destination.

In the initial state, as shown in FIG. 12, the radio mobile station 3 transmits a quality measurement result message to the radio base station 2A that is providing the cellular network managing function (step S70). As in FIGS. 5 and 6 in which the control procedure in the first embodiment is shown, in FIG. 12, only one of quality measurement result messages transmitted periodically or non-periodically is shown.

When the radio base station 2A receives the quality measurement result message, the radio base station 2A checks contents of the quality measurement result message. As a result, when the radio base station 2A determines that communication quality is deteriorated and determines that handover for switching the connection destination from the own station to another radio base station 2 is necessary, the radio base station 2A transmits a handover request message to the radio base station 2B at a handover destination (step S71). When the radio base station 2A generates the handover request message, the radio base station 2A includes connection state management information (information indicating a communication state) concerning the radio mobile station 3 to be controlled (the radio mobile station 3 that performs handover) in the handover request message. In this embodiment, as in the embodiments explained above, the radio base stations 2 that relay the handover request message perform transfer after recording the number of times of message transfer in the handover request message. Consequently, the radio base station 2B at a destination of the handover request message can learn how many times the handover request message is transferred to reach the radio base station 2B. In this example, the radio base station 2B at the handover destination detects that the handover request message is transferred once. The radio base station 2B confirms that the radio mobile station 3 to be controlled is in non-communication (waiting).

Each of the radio base stations 2 according to this embodiment stores, for each connection state, a plurality of (two) largest numbers of hops (thresholds) between the radio base station 2 that provides the radio mobile station 3 connected to the own apparatus with the cellular network managing function and the own apparatus. When each of the radio base stations 2 functions as a radio base station at the handover destination and executes handover processing, the radio base station 2 compares the number of times of transfer of the handover request message and a threshold (the maximum number of hops) corresponding to a connection state of the radio mobile station 3 to be controlled. Specifically, if the connection state of the radio mobile station 3 is a non-communication state, the radio base station 2 compares the number of times of transfer and a threshold used during the non-communication state. On the other hand, if the connection state of the radio mobile station 3 is a communication state, the radio base station 2 compares the number of times of transfer and a threshold used during the communication state. When the number of times of transfer reaches the threshold, the radio base station 2 also executes processing for changing the radio base station that provides the cellular network managing function. On the other hand, when the number of times of transfer is smaller than the threshold, the radio base station 2 does not perform the processing for changing the radio base station that provides the cellular network managing function.

The threshold corresponding to the communication state is used in this way. Therefore, for example, in handover in the communication state, it is possible to make the processing for changing the radio base station that provides the cellular network managing function less easily performed and secure real-time properties of communication. In handover in the non-communication state, it is possible to make the changing processing easily performed and efficiently suppress a consumption amount of radio resources.

Referring back to the sequence shown in FIG. 12, when the radio base station 2B receives the handover request message transmitted at step S71, the radio base station 2B checks the connection state management information, grasps a communication state of the radio mobile station 3 to be controlled, and compares a maximum number of hops (a threshold) corresponding to the communication state and the number of times of transfer recorded in the received handover request message. For convenience of explanation, it is assumed that the condition of the number of times of transfer<the threshold is not satisfied. In the case of the number of times of transfer≥the threshold, the radio base station 2B determines to change the radio base station that provides the cellular network managing function. The radio base station 2B returns a handover response message to the radio base station 2A (step S72).

The radio base station 2A that receives the handover response message transmits a handover instruction message to the radio mobile station 3 and instructs handover to the radio base station 2B (step S73). When the radio mobile station 3 receives the handover instruction message, the radio mobile station 3 switches the connection destination from the radio base station 2A to the radio base station 2B according to instruction contents of the handover instruction message and then transmits a handover completion message to the radio base station 2B (step S74).

The radio base station 2B that receives the handover completion message transmits a path reset request message to the gateway 1 to reset a path for transferring data of the radio mobile station 3 between the radio base station 2B and the gateway 1 (steps S75 and S76). This message reaches the gateway 1 through the radio base station 2A.

The gateway 1 that receives the path reset request message performs reset processing for a data transfer path. When the setting is completed, the gateway 1 returns a path reset response message including information concerning the reset data transfer path to the radio base station 2B (steps S77 and S78). This message reaches the radio base station 2B through the radio base station 2A.

The radio base station 2B that receives the path reset response message transmits a resource release request message to the radio base station 2A to release resources of the radio base station 2A that has been providing the radio mobile station 3 with the cellular network managing function (step S79). The radio base station 2A that receives the resource release request message releases resources concerning the radio mobile station 3.

According to the control procedure explained above, the handover from the radio base station 2A to the radio base station 2B and the switching processing for the data transfer path involved in the handover (handover involving a change of the radio base station that provides the cellular network managing function) are completed. Thereafter, the radio mobile station 3 communicates with the gateway 1 through the radio base station 2B. A communication path between the radio mobile station 3 and the gateway 1 in this state is a communication path of the radio mobile station 3, the radio base station 2B, the radio base station 2A, and the gateway 1.

As explained above, in the multi-hop cellular radio system according to this embodiment, when the radio mobile station moves to under the each of the radio base stations, the radio base station determines, taking into account a communication state of the radio mobile station, whether to change the radio base station that provides the cellular network managing function. Consequently, for example, when the radio mobile station is in communication, it is possible to perform flexible control corresponding to the communication state of the radio mobile station, for example, to make it less easy to execute processing for changing the radio base station that provides the cellular network managing function and make the communication less easily interrupted.

Fifth Embodiment

A communication control method according to a fifth embodiment is explained. In this embodiment, a modification of the fourth embodiment explained above, i.e., a modification of the control procedure performed taking into account a communication state of a radio mobile station, a connection destination of which is switched, is explained. The configuration of a multi-hop cellular network according to this embodiment and internal configurations of components are the same as those in the first embodiment (see FIGS. 1 to 4).

In this embodiment, a control procedure performed when a state in which the radio mobile station 3 makes a connection to the radio base station 2A, communicates with a core network through the gateway 1, and is provided with a cellular network managing function from the radio base station 2A is set as an initial state (see FIG. 1) and the radio mobile station 3 moves from this state and switches the connection destination to the radio base station 2C is explained. In the following explanation, it is assumed that the radio mobile station 3 moves from under the radio base station 2B to under the radio base station 2C while the radio mobile station 3 is in communication.

A control procedure performed when the radio mobile station 3 in communication switches a connection destination, i.e., a control procedure performed when the radio mobile station 3 in the initial state moves from under the radio base station 2B to under the radio base station 2C when the radio base station 2A stores connection state management information shown in FIG. 13 is explained with reference to FIG. 14. FIG. 13 is a diagram of an example of connection state management information (information concerning a communication state of the radio mobile station that is providing the cellular network managing function) managed by the radio base station 2A. FIG. 14 is a diagram of a sequence in which the radio mobile station 3 in communication moves from under the radio base station 2B to under the radio base station 2C and switches a connection destination.

In the initial state, as shown in FIG. 14, the radio mobile station 3 transmits a quality measurement result message to the radio base station 2A that is providing the cellular network managing function (steps S80 and S81). This message reaches the radio base station 2A through the radio base station 2B. As in FIGS. 5 and 6 in which the control procedure in the first embodiment is shown, in FIG. 14, only one of quality measurement result messages transmitted periodically or non-periodically is shown.

When the radio base station 2A receives the quality measurement result message, the radio base station 2A checks contents of the quality measurement result message. As a result, when the radio base station 2A determines that communication quality is deteriorated and determines that handover for switching the connection destination is necessary, the radio base station 2A transmits a handover request message to the radio base station 2C at a handover destination (steps S82 and S83). This message reaches the radio base station 2C through the radio base station 2B. When the radio base station 2A generates the handover request message, the radio base station 2A includes connection state management information (information indicating a communication state) concerning the radio mobile station 3 to be controlled (the radio mobile station 3 that performs handover) in the handover request message. In this embodiment, as in the embodiments explained above, the radio base stations 2 that relay the handover request message perform transfer after recording the number of times of message transfer in the handover request message. Consequently, the radio base station 2C at a destination of the handover request message can learn how many times the handover request message is transferred to reach the radio base station 2C. In this example, the radio base station 2C at the handover destination detects that the handover request message is transferred twice. The radio base station 2C confirms that the radio mobile station 3 to be controlled is in communication.

Like the radio base stations 2 explained in the first embodiment and the like, each of the radio base stations 2 according to this embodiment stores a largest number of hops (a threshold) between the radio base station 2 that provides the radio mobile station 3 connected to the own apparatus with the cellular network managing function and the own apparatus. However, a control operation performed using the stored maximum number of hops is partially different from the control operation in the first embodiment.

Specifically, when each of the radio base stations 2 functions as a radio base station at the handover destination and executes handover processing, the radio base station 2 determines, based on the number of times of transfer of the handover request message and a communication state (connection state management information) of the radio mobile station 3 that moves to under the own station, whether to change the radio base station that provides the cellular network managing function. Specifically, first, each of the radio base stations 2 checks whether the radio mobile station 3 moving to under the own station is in a communication state. If the radio mobile station 3 is in communication, the radio base station 2 determines not to change the radio base station that provides the cellular network managing function. If the radio mobile station 3 is in non-communication, the radio base station 2 compares the number of times of transfer of the received handover request message and the maximum number of hops. When the number of times of transfer reaches the maximum number of hops, the radio base station 2 determines to change the radio base station that provides the cellular network managing function.

Referring back to the sequence shown in FIG. 14, because the radio mobile station 3 about to switch the connection destination from the radio base station 2B to the radio base station 2C is in communication, when the radio base station 2C receives the handover request message transmitted at step S82, the radio base station 2C determines not to change the radio base station that provides the cellular network managing function. The radio base station 2C returns a handover response message to the radio base station 2A (steps S84 and S85). This message reaches the radio base station 2A through the radio base station 2B.

The radio base station 2A that receives the handover response message transmits a handover instruction message to the radio mobile station 3 and instructs handover to the radio base station 2C (steps S86 and S87). This message reaches the radio mobile station 3 through the radio base station 2B. When the radio mobile station 3 receives the handover instruction message, the radio mobile station 3 switches the connection destination from the radio base station 2B to the radio base station 2C according to instruction contents of the handover instruction message and then transmits a handover completion message to the radio base station 2C (step S88).

According to the control procedure explained above, the handover from the radio base station 2B to the radio base station 2C and the switching processing for the data transfer path involved in the handover (handover not involving a change of the radio base station that provides the cellular network managing function) are completed. Thereafter, the radio mobile station 3 communicates with the gateway 1 through the radio base station 2C. A communication path between the radio mobile station 3 and the gateway 1 in this state is a communication path of the radio mobile station 3, the radio base station 2C, the radio base station 2B, and the gateway 1.

In the explanation in this embodiment, as the connection information used together with the threshold in the processing for determining whether to change the radio base station that provides the cellular network managing function, the information concerning the communication state (in communication or in non-communication) of the radio mobile station 3 to be controlled is used. However, other information can be used. As usable connection information, for example, there is information concerning a communication type (real-time communication (e.g., sound) or non-real-time communication (e.g., data)). When this communication type information is used, during the real-time communication, the base station that provides the cellular network managing function is not changed to reduce a switching time. It is also possible that information concerning a data transfer amount in a fixed time is used as the connection information and, if the data transfer amount is equal to or larger than a fixed amount, it is determined that the radio mobile station 3 is in high-speed communication and the base station that provides the cellular network managing function is not changed to reduce a switching time.

When the radio base station that provides the cellular network managing function is not changed during handover of the radio mobile station, thereafter, the radio base station that provides the cellular network managing function is switched after the radio mobile station changes from in communication to in non-communication. Specifically, the reset processing for the data transfer path (the processing equivalent to steps S29 to S35 in FIG. 6 or steps S49 to S57 in FIG. 8) included in the second control procedure explained in the first embodiment (see FIG. 6) or the control procedure involving a change of the gateway explained in the second embodiment (see FIG. 8) is executed.

As explained above, in the multi-hop cellular radio system according to this embodiment, when the radio mobile station moves to under the each of the radio base stations, the radio base station determines, taking into account a communication state of the radio mobile station, whether to change the radio base station that provides the cellular network managing function. Consequently, for example, when the radio mobile station is in communication, the processing for changing the radio base station that provides the cellular network managing function is not executed. Therefore, it is possible to reduce time for the switching processing for the connection destination involved in handover of the radio mobile station.

In the above explanation, the radio base stations 2 transfer a message after recording the number of times of transfer of the message in the handover request message. When the radio mobile station to be controlled is in non-communication, the radio base station 2 at the handover destination determines based on the number of times of transfer whether to switch the radio base station that provides the cellular network managing function. However, instead of this method of using the number of times of transfer, it is also possible to use the method explained in the last part of the first embodiment. Specifically, each of the radio base stations 2 recognizes in advance the radio base station 2 that provides the radio mobile station 3 connected to the own apparatus with the cellular network managing function. When the radio mobile station 3 that moves to under the own station is provided with the cellular network managing function from the radio base station 2 different from the one recognized in advance, the radio base station 2 switches the radio base station that provides the cellular network managing function.

INDUSTRIAL APPLICABILITY

As explained above, the communication control method according to the present invention is useful for a multi-hop cellular radio communication system and, in particular, suitable for a communication control method for realizing efficient use of radio resources.

The invention claimed is:

1. A communication control method executed in a multi-hop cellular network including at least one gateway and a plurality of radio base stations having a cellular network managing function for performing radio resource management and movement management for a radio mobile station, the communication control method comprising:
   transmitting a request from a first radio base station that is performing the radio resource management and the movement management of the radio mobile station connected to the multi-hop cellular network, when the first radio base station determines that it is necessary to switch a connection destination of the radio mobile station, to a second radio base station at a handover destination to perform handover processing;
   instructing the radio mobile station to perform handover to the second radio base station; and
   determining, in the second radio base station, based on a number of times of transfer of the request transmitted from the first radio base station and received in the second radio base station, whether to replace the first radio base station as a radio base station that performs the radio resource management and the movement management of the radio mobile station.

2. The communication control method according to claim 1, wherein, in the determining whether to replace the first radio base station, when it is determined to replace the first radio base station as a radio base station that performs the radio resource management and the movement management of the radio mobile station, the second radio base station takes over the radio resource management and the movement management of the radio mobile station.

3. The communication control method according to claim 1, wherein, in the determining whether to replace the first radio base station, when it is determined to replace the first radio base station as a radio base station that performs the radio resource management and the movement management of the radio mobile station, the second radio base station requests a gateway associated with the second radio base station in advance to reset a data transfer path between the second radio base station and the radio mobile station.

4. The communication control method according to claim 3, wherein, when the first and second radio base stations are respectively associated with different gateways in advance, the second radio base station requests the gateway associated with the second radio base station to reset a data transfer path while changing a gateway that forms a data transfer path between the second radio base station and the radio mobile station.

5. The communication control method according to claim 1, wherein the second radio base station checks whether an overlapping section is included in a data transfer path immediately after the radio mobile station executes the handover and, if the overlapping section is included, determines, irrespective of a determination result in the determining whether to replace the first radio base station, that a replacement of the first radio base station as a radio base station that performs the radio resource management and the movement management of the radio mobile station is carried out.

6. The communication control method according to claim 1, wherein
the first radio base station also manages a communication state of the radio mobile station for which the first radio base station performs the radio resource management and the movement management,
when the first radio base station transmits the request to the second radio base station to perform the handover processing, the first radio base station also notifies a communication state of the radio mobile station, and
in the determining whether to replace the first radio base station, the second radio base station determines, based on the number of times of transfer and the notified communication state, whether to replace the first radio base station as a radio base station that performs the radio resource management and the movement management of the radio mobile station.

7. The communication control method according to claim 6, wherein, in the determining whether to replace the first radio base station, the second radio base station evaluates the number of times of transfer using different thresholds when the communication state is in communication and when the communication state is in non-communication to thereby determine whether to replace the first radio base station as a radio base station that performs the radio resource management and the movement management of the radio mobile station.

8. The communication control method according to claim 6, wherein, in the determining whether to replace the first radio base station, the second radio base station evaluates the number of times of transfer using different thresholds when the communication state is in real-time communication and when the communication state is in non-real-time communication to thereby determine whether to replace the first radio base station as a radio base station that performs the radio resource management and the movement management of the radio mobile station.

9. The communication control method according to claim 6, wherein, in the determining whether to replace the first radio base station, the second radio base station evaluates the number of times of transfer using different thresholds when the communication state indicates communication in which a data transfer amount per unit time reaches a specific value and when the communication state does not indicate the communication to thereby determine whether to replace the first radio base station as a radio base station that performs the radio resource management and the movement management of the radio mobile station.

10. The communication control method according to claim 6, wherein, in the determining whether to replace the first radio base station, when the communication state is in communication, the second radio base station determines not to replace the first radio base station as a radio base station that performs the radio resource management and the movement management of the radio mobile station.

11. The communication control method according to claim 10, wherein, in the determining whether to replace the first radio base station, when the second radio base station determines not to replace the first radio base station as a radio base station that performs the radio resource management and the movement management of the radio mobile station because the communication state is in communication, after the radio mobile station ends communication, the second radio base station determines again, based on the number of times of transfer, whether to replace the first radio base station as a radio base station that performs the radio resource management and the movement management of the radio mobile station.

12. A communication control method executed in a multi-hop cellular network including at least one gateway and a plurality of radio base stations having a cellular network managing function for performing radio resource management and movement management for a radio mobile station, the communication control method comprising:
transmitting a request from a first radio base station that is performing the radio resource management and the movement management of the radio mobile station connected to the multi-hop cellular network, when the first radio base station determines that it is necessary to switch a connection destination of the radio mobile station, to a second radio base station at a handover destination to perform handover processing;
instructing the radio mobile station to perform handover to the second radio base station; and
determining, in the second radio base station, based on a radio base station determined in advance as a radio base station that performs the radio resource management and the movement management of a radio mobile station connected to the second radio base station, whether to replace the first radio base station as a radio base station that performs the radio resource management and the movement management of the radio mobile station, wherein the determining is performed independently of the determination that it is necessary to switch the connection destination of the radio mobile station.

13. The communication control method according to claim 12, wherein
the first radio base station also manages a communication state of the radio mobile station for which the first radio base station performs the radio resource management and the movement management, when the first radio base station transmits the request to the second radio base station to perform the handover processing, the first radio base station also notifies a communication state of the radio mobile station, and in the determining whether to replace the first radio base station, the second radio base station determines, based on the information concerning the radio base station determined in advance as the radio base station that performs the radio resource management and the movement management of the radio mobile station connected to the second radio base station, and the notified communication information, whether to replace the first radio base station as a radio base station that performs the radio resource management and the movement management of the radio mobile station.

14. The communication control method according to claim 13, wherein, in the determining whether to replace the first radio base station, when the communication state is in communication, the second radio base station determines not to replace the first radio base station as a radio base station that performs the radio resource management and the movement management of the radio mobile station.

15. The communication control method according to claim 14, wherein, in the determining whether to replace the first radio base station, when the second radio base station determines not to replace the first radio base station as a radio base station that performs the radio resource management and the movement management of the radio mobile station because the communication state is in communication, after the radio mobile station ends communication, the second radio base station determines, based on the information concerning the radio base station determined in advance as the radio base station that performs the radio resource management and the movement management of the radio mobile station connected to the second radio base station, whether to replace the first radio base station as a radio base station that performs the radio resource management and the movement management of the radio mobile station.

16. The communication control method according to claim 12, wherein the second radio base station checks whether an overlapping section is included in a data transfer path immediately after the radio mobile station executes the handover and, if the overlapping section is included, determines, irrespective of a determination result in the determining whether to replace the first radio base station, that a replacement of the first radio base station as a radio base station that performs the radio resource management and the movement management of the radio mobile station is carried out.

17. A radio base station that configures a multi-hop cellular network in conjunction with a gateway and has a cellular network managing function for performing radio resource management and movement management concerning a radio mobile station connected to the network, wherein, when the radio base station receives a handover request message addressed to itself generated by another radio base station, the radio base station determines, based on a number of times the message transfers until the message reaches the radio base station, whether to change a radio base station that performs the radio resource management and the movement management of a radio mobile station corresponding to the message.

18. The radio base station according to claim 17, wherein, when the radio base station determines to change the radio base station that performs the radio resource management and the movement management of the radio mobile station corresponding to the message, the radio base station takes over the radio resource management and the movement management of the radio mobile station.

19. The radio base station according to claim 17, wherein, when the radio base station receives a handover request message not addressed to itself, the radio base station transfers the message after updating number-of-times-of-transfer information included in the message.

* * * * *